US012620871B2

(12) United States Patent　　(10) Patent No.: US 12,620,871 B2
Ledieu　　(45) Date of Patent: May 5, 2026

(54) ELECTRIC MOTORIZATION DEVICE INTEGRATING AN ELECTRICALLY INSULATING HEAT SINK

(71) Applicant: NOVARES FRANCE, Clamart (FR)

(72) Inventor: Cédric Ledieu, Mont Saint Eloi (FR)

(73) Assignee: NOVARES FRANCE, Clamart (FR)

( * ) Notice: Subject to any disclaimer, the term of this patent is extended or adjusted under 35 U.S.C. 154(b) by 270 days.

(21) Appl. No.: 17/928,474

(22) PCT Filed: May 4, 2021

(86) PCT No.: PCT/FR2021/050765
§ 371 (c)(1),
(2) Date: Nov. 29, 2022

(87) PCT Pub. No.: WO2021/240084
PCT Pub. Date: Dec. 2, 2021

(65) Prior Publication Data
US 2023/0208253 A1　　Jun. 29, 2023

(30) Foreign Application Priority Data

May 29, 2020　(FR) ...................................... 2005693

(51) Int. Cl.
H02K 9/19　　(2006.01)
H02K 5/04　　(2006.01)
(52) U.S. Cl.
CPC ................. H02K 9/19 (2013.01); H02K 5/04 (2013.01)

(58) Field of Classification Search
CPC . H02K 11/33; H02K 5/04; H02K 9/19; H02K 9/197; H02K 5/20
(Continued)

(56) References Cited

U.S. PATENT DOCUMENTS 4,668,898 A * 5/1987 Harms ................... H02K 11/33
310/227
6,019,165 A * 2/2000 Batchelder ............ H01L 23/427
165/80.4
(Continued)

FOREIGN PATENT DOCUMENTS

CN　　107905995 A　　4/2018
FR　　　3060900 A1　　6/2018

OTHER PUBLICATIONS

Translation of foreign document FR 3060900 A1 (Year: 2018).*
(Continued)

*Primary Examiner* — Alex W Mok
(74) *Attorney, Agent, or Firm* — CANTOR COLBURN LLP

(57) ABSTRACT
An electric motorization device including an electric motor, an electronic system comprising power electronic elements, and a heat sink that is intended to cool the electronic system. The heat sink comprises a first shell configured to allow heat exchange between a coolant fluid and the electronic system, and a second shell configured to prevent heat exchange between the coolant fluid and the electric motor. The first shell and the second shell together define a cavity configured to allow the passage of the coolant fluid. The first shell and the second shell are each made of a material configured to ensure electrical insulation, in particular between the electronic system, the coolant fluid and the electric motor.

9 Claims, 3 Drawing Sheets

(58) Field of Classification Search

USPC ............................................................ 310/54

See application file for complete search history.

(56) References Cited

U.S. PATENT DOCUMENTS

| | | | | | |
|---|---|---|---|---|---|
| 7,049,716 | B2 | | 5/2006 | Grundl et al. | |
| 7,102,260 | B2 * | | 9/2006 | Takenaka | H02K 5/18 |
| | | | | | 310/52 |
| 7,525,224 | B2 * | | 4/2009 | Takenaka | H02K 11/33 |
| | | | | | 310/52 |
| 7,796,389 | B2 * | | 9/2010 | Edmunds | F28D 15/0233 |
| | | | | | 361/679.52 |
| 8,064,198 | B2 * | | 11/2011 | Higashidani | H05K 7/20927 |
| | | | | | 361/689 |
| 8,875,825 | B2 * | | 11/2014 | Asakura | B60K 6/405 |
| | | | | | 310/52 |
| 9,356,492 | B2 * | | 5/2016 | Chamberlin | H02K 5/203 |
| 9,732,765 | B2 * | | 8/2017 | Surowinski | H02K 11/33 |
| 9,966,818 | B2 * | | 5/2018 | Lee | H02K 9/08 |
| 2001/0014029 | A1 * | | 8/2001 | Suzuki | H05K 7/20927 |
| | | | | | 363/141 |
| 2019/0368413 | A1 * | | 12/2019 | Carter | H05K 7/20927 |

OTHER PUBLICATIONS

International Search Report for corresponding International Application No. PCT/FR2021/050765; Date of Mailing: Sep. 17, 2021; (2 pages) English Translation.

International Search Report for corresponding International Application No. PCT/FR2021/050765; Date of Mailing: Sep. 8, 2021; (3 pages) No English Translation.

Written Opinion of International Application PCT/FR2021/050765; Dec. 27, 2021; 7 pages; no English Translation.

* cited by examiner

ELECTRIC MOTORIZATION DEVICE INTEGRATING AN ELECTRICALLY INSULATING HEAT SINK

CROSS REFERENCE TO RELATED APPLICATIONS

This application is a National Stage of PCT Application No. PCT/FR2021/050765 filed on May 4, 2021, which claims priority to French Patent Application No. 20/05693 filed on May 29, 2020, the contents each of which are incorporated herein by reference thereto.

TECHNICAL FIELD

The present invention relates to an electric motorization device comprising an electric motor.

BACKGROUND

In general, the current electric motors include a rotor secured to a shaft and a stator which surrounds the rotor. The stator is mounted in a casing which includes bearings for the rotational mounting of the shaft. The rotor includes a body formed by a bundle of laminations or polar wheels (claw pole) held in the form of a stack by means of a suitable fastening system. The body of the rotor includes internal cavities housing permanent magnets. The stator includes a body consisting of a bundle of laminations forming a crown, the inner face of which is provided with teeth delimiting two by two a plurality of slots open towards the inside of the stator body and intended to receive phase windings.

The electric motors being likely to be damaged or even destroyed in the event of overheating of the rotor, it is generally necessary to equip electric motors with a cooling system to lower the general temperature of the motor, and in particular when it overheats.

Furthermore, the supply of the electric motor and its driving require the integration of an electronic system. Generally, these electronic systems comprise a regulator making it possible to vary the intensity of the current, and a power converter such as an inverter, making it possible to transform a direct current into alternating current. However, depending on the type of electric motor used and depending on the electronic components used in the electronic system, the on-board voltages used may be different. Thus, during assembly of the electric motor and its operation, malfunctions may occur if the masses of the various systems are not isolated. Furthermore, to obtain a long-lasting and optimal operation of the electric motorization device, it is important to also guarantee cooling of the electronic system.

It is known to use glycol water in the cooling circuit of the electric motor, and/or to use an aluminum heat sink. This solution is satisfactory in that it allows the motor to be cooled. However, glycol water has electrical conductivity, so it is not possible to integrate the electronic system.

BRIEF SUMMARY

The purpose of the present invention is to propose a solution which responds to all or part of the aforementioned problems:

This goal may be achieved through the implementation of an electric motorization device comprising:

an electric motor comprising a rotor intended to be set in motion, a stator, and a cooling chamber configured to cool the electric motor;

an electronic system comprising power electronic elements, said power electronic elements being configured to drive the electric motor;

a heat sink interposed between the electric motor and the electronic system, said heat sink being intended to cool the electronic system and comprising:

a first shell intended to cooperate with the electronic system, and configured to allow a heat exchange between a cooling fluid and the electronic system;

a second shell intended to cooperate with the electric motor on the one hand and with the first shell on the other hand, said second shell being configured to prevent a heat exchange between the cooling fluid and the electric motor.

The first shell and the second shell defining between them a cavity, said cavity being configured to allow the passage of the cooling fluid.

The first shell and the second shell are each constituted of a material configured to guarantee an electrical insulation, in particular between the electronic system, the cooling fluid and the electric motor.

The provisions previously described make it possible to guarantee electrical insulation between the power electronic elements of a vehicle (with electric motorization, hybrid or originating from a fuel cell) which may comprise an inverter, and the electric motor. In this way, the masses of the different electric systems are isolated from each other, and the overvoltages between each network of different voltages are avoided. Furthermore, the passage of the cooling fluid in the cavity makes it possible to cool the electronic system.

The electric motorization device may also have one or more of the following characteristics, taken alone or in combination.

According to one embodiment, the first shell is formed of a composite material configured to be electrically insulating and thermally conductive, said composite material comprising thermally conductive fillers of the group comprising aluminum oxides, aluminosilicates, aluminum or magnesium hydroxides, boron nitrides.

According to one embodiment, the second shell is formed of an electrically insulating and thermally insulating plastic material, for example belonging to the group comprising polyolefins, styrene materials, polyamides, poly(phenylene sulphide), polysulphones and composites reinforced with non-conductive mineral fillers such as fiberglass.

According to one embodiment, the heat sink comprises at least one fluid inlet which is fluidly connected with the cavity, said at least one fluid inlet being configured to allow the entry of the cooling fluid into the cavity; and at least one fluid outlet which is fluidly connected with the cavity on the one hand and with the cooling chamber on the other hand, and intended to allow the passage of the cooling fluid from the cavity to the cooling chamber.

According to one embodiment, the fluid outlet is fluidly connected with a general glycol circuit of the vehicle, in particular in the case where the electronic system is separate from the electric motor.

The provisions previously described make it possible to have a cooling circuit common between the electric motor and the electronic system.

According to one embodiment, the fluid inlet comprises a tube configured to cooperate with an inlet orifice, made in the second shell, said inlet orifice being configured to ensure a fluid connection between the tube and the cavity.

According to one embodiment, the heat sink comprises at least one wall secured to the first shell and/or to the second shell, said at least one wall projecting into the cavity and being configured to direct the passage of the cooling fluid into the cavity.

According to one embodiment, the at least one wall is configured to define a circuit for the passage of the cooling fluid in the cavity.

According to one embodiment, the at least one wall has at least one wall section having a curved shape.

According to one embodiment, the heat sink comprises a plurality of walls providing a heat exchange surface between the cooling fluid and the material constituting the plurality of walls.

In this way, the circuit for the passage of the cooling fluid makes it possible to cool more effectively the first shell by increasing the heat exchange surface.

According to one embodiment, the electric motor is configured to operate at a voltage substantially equal to 48V.

According to one embodiment, the electronic system is configured to operate at a voltage substantially equal to 12V.

According to another embodiment, the electronic system is configured to operate at a voltage substantially equal to 24V.

According to another embodiment, the electronic system is configured to operate at a voltage of between 12V and 52V.

The power electronic elements may in particular comprise one or more elements included in the group comprising an inverter, a rectifier, a voltage step-up, or a voltage step-down. Furthermore, the electronic system may comprise transistors (Mosfet, IGBT) configured to drive the electric motor by allowing the passage or alternatively the suppression of the currents in the stator windings.

According to one embodiment, the first shell comprises first fastening means intended to make it possible to secure the electronic system to the first shell.

According to one embodiment, the first shell comprises non-opening threaded holes so that the electronic system is screwed onto the first shell.

According to one embodiment, the first shell and the second shell comprise second fastening means configured to secure said first shell to said second shell.

According to one embodiment, the first shell may be fastened to the second shell by gluing, by screwing, by welding or by clipping.

According to one embodiment, the first shell has a shape adapted to cooperate with the electronic system.

According to one embodiment, the first shell comprises a plate, for example having the shape of a disc, configured to allow the fastening of the electronic system onto the plate.

According to one embodiment, all or part of the electronic system may be screwed, glued, welded or printed on the first shell.

According to one embodiment, the second shell has a shape adapted to the electric motor.

In general, the electric motors have a cylindrical shape. In this case, the second shell may have a cylindrical shape to interfit and cooperate with the electric motor.

BRIEF DESCRIPTION OF THE DRAWINGS

Other aspects, objects, advantages and characteristics of the invention will appear better on reading the following detailed description of preferred embodiments thereof, given by way of non-limiting example, and made with reference to the appended drawings on which.

DETAILED DESCRIPTION

In the figures and in the remainder of the description, the same references represent identical or similar elements. In addition, the various elements are not shown to scale so as to favor the clarity of the figures. Furthermore, the different embodiments and variants are not mutually exclusive and may be combined with one another.

Figure 1:
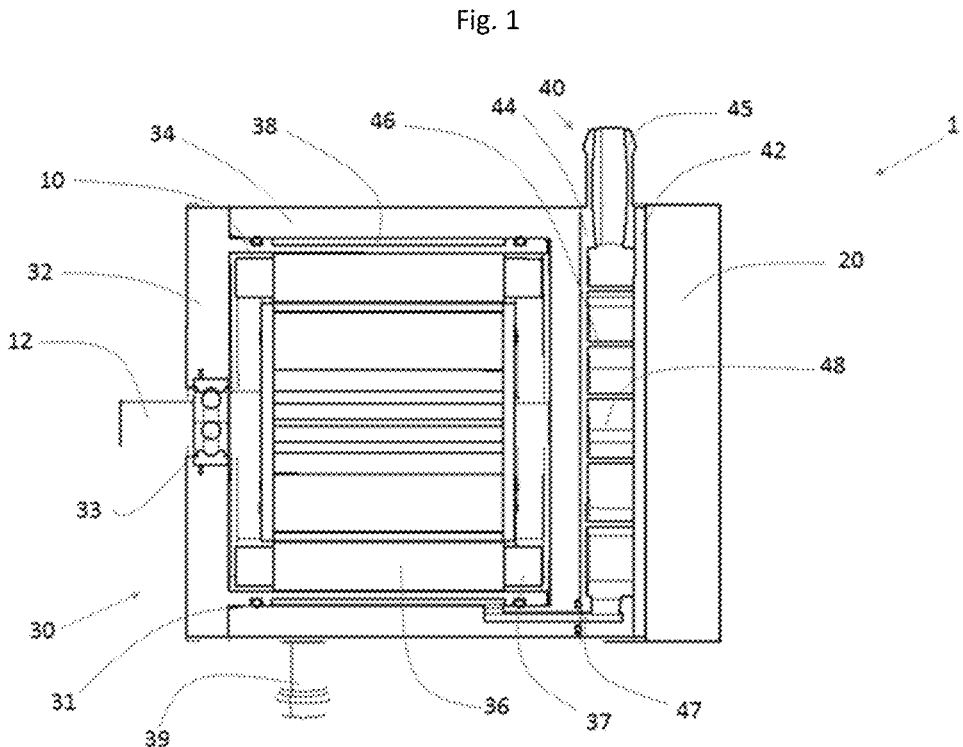
FIG. 1 is a cross-sectional schematic view of the electric propulsion system according to a particular embodiment.
Figure 2:
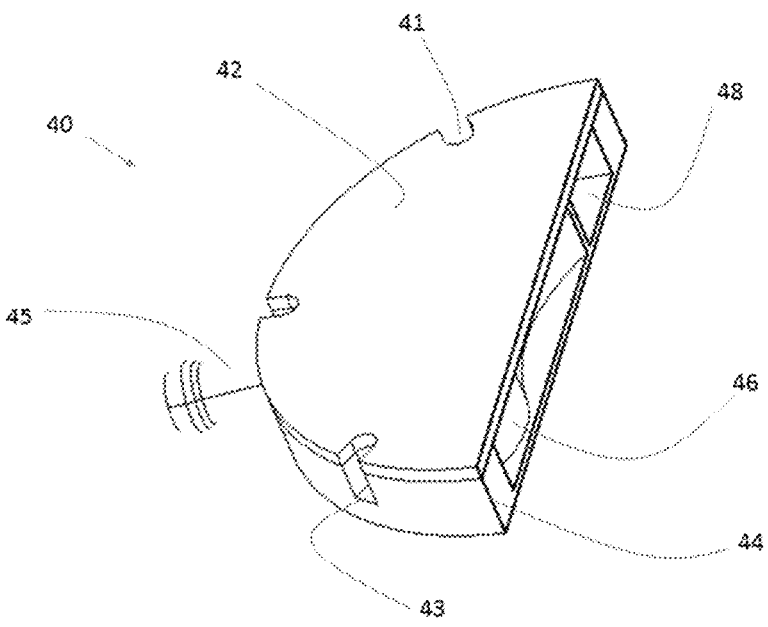
FIG. 2 is a perspective view of the heat sink of FIG. 1.
Figure 3:
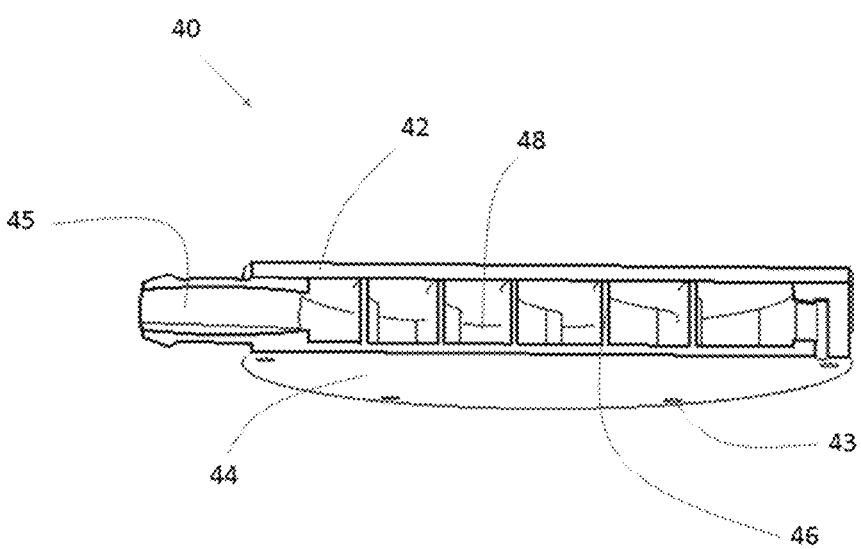
FIG. 3 is a cross-sectional view of the heat sink of FIG. 1.
Figure 4:
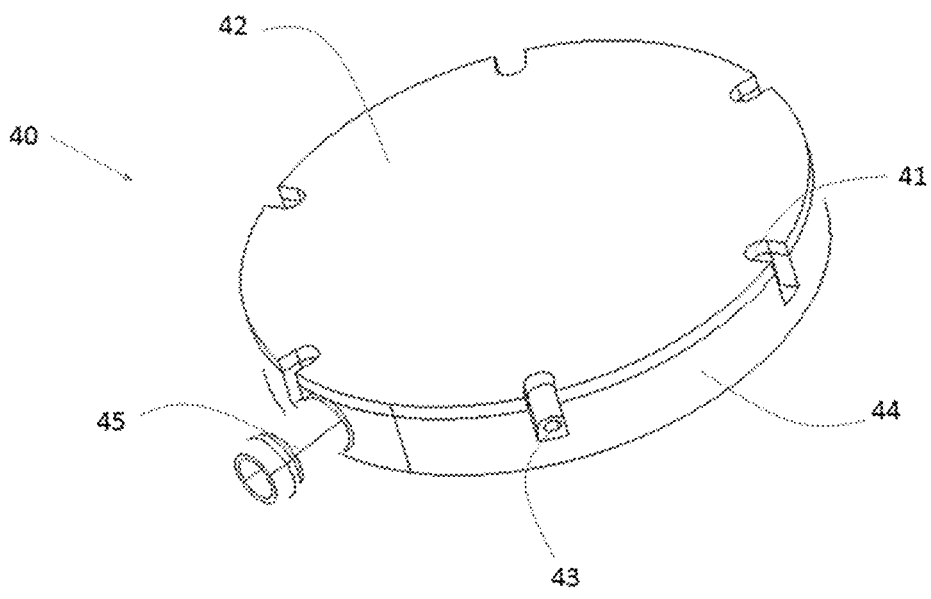
FIG. 4 is a perspective view of the heat sink of FIG. 1.
Figure 5:
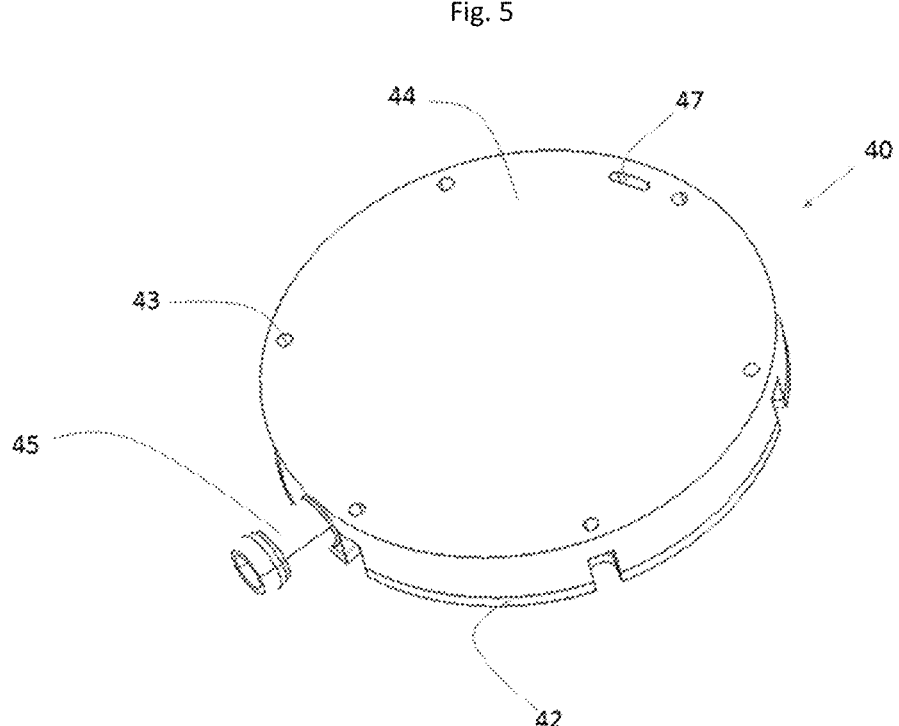
FIG. 5 is a perspective view of the heat sink of FIG. 1.
Figure 6:
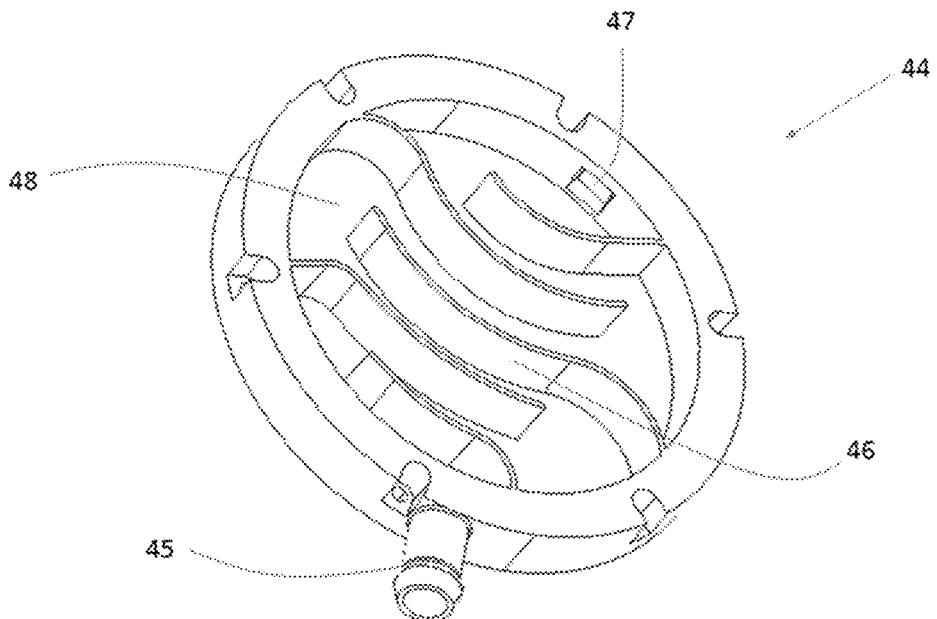
FIG. 6 is a perspective view of the second shell included in the heat sink of FIG. 1.

As illustrated in FIG. 1, the invention relates to an electric motorization device 1 comprising an electronic system 20, an electric motor 30, and a heat sink 40.

The electric motor 30 comprises a rotor 10 intended to be set in motion, a stator 36 and a cooling chamber 38 disposed on the periphery of the rotor 1 and configured to cool the electric motor 30. This electric motor 30 comprises in particular a casing in two parts housing the rotor 10 secured in rotation to a rotor shaft 12 and an annular stator 36 which surrounds the rotor 10 coaxially with the rotor shaft 12. The casing consists in particular of a front bearing 32 and a rear bearing 34 connected to each other for example by means of screws. The bearings 32, 34 are hollow-shaped and each generally centrally carry a bearing, for example ball bearings 33, for the rotational mounting of the rotor shaft 12.

As illustrated in FIG. 1, winding heads 37 project axially on either side of the stator body 36 and are housed in the intermediate space separating the stator 36 from the respective bearings 32, 34.

In general, the electric motor 30 is configured to operate at a voltage substantially equal to 48V.

The electronic system 20 may comprise power electronic elements, said power electronic elements being configured to drive the electric motor 30.

The power electronic elements may in particular comprise one or more elements included in the group consisting of an inverter, a rectifier, a voltage step-down or step-up. Furthermore, the electronic system 20 may comprise transistors (Mosfet, IGBT) configured to drive the electric motor 30 by allowing the passage or alternatively the suppression of the currents in the stator windings.

Depending on the vehicle on which the electric motorization device 1 is installed, the electronic system 20 may be configured to operate at a voltage substantially equal to 12V, or at a voltage substantially equal to 24V, or at a voltage of between 12V and 52V.

The heat sink 40 is interposed between the electric motor 30 and the electronic system 20.

The heat sink 40 may be intended to cool the electronic system 20 and/or the electric motor 30.

According to the embodiment shown in FIG. 1, the heat sink 40 comprises at least one fluid inlet 45 configured to allow the entry of the cooling fluid into a cavity 48 included in the heat sink 40; and at least one fluid outlet 47 which is fluidly connected with the cavity 48 on the one hand and with the cooling chamber 38 on the other hand. In this way a cooling fluid may circulate from the cavity 48 to the cooling chamber 38.

The provisions described make it possible to have a cooling circuit common between the electric motor 30 and the electronic system 20.

Referring to FIGS. 2 to 5, the heat sink 40 comprises a first shell 42 intended to cooperate with the electronic system 20, and a second shell 44 intended to cooperate with the electric motor 30 on the one hand and with the first shell 42 on the other hand. The first shell 42 and the second shell 44 define between them a cavity 48 configured to allow the passage of the cooling fluid.

Advantageously, the first shell 42 and the second shell 44 are each made of a material guaranteeing electrical insulation, in particular between the electronic system 20, the cooling fluid and the electric motor 30.

Furthermore, the first shell 42 may be configured to allow a heat exchange between the cooling fluid and the electronic system 20, and the second shell 44 can be configured to prevent a heat exchange between the cooling fluid and the electric motor 30.

In other words, the first shell 42 may be made of a composite material configured to be electrically insulating and thermally conductive, said composite material comprising thermally conductive fillers belonging to the group consisting of aluminum oxides, aluminosilicates, aluminum or magnesium hydroxides, boron nitrides, and the second shell 44 may be made of a electrically insulating and thermally insulating plastic or composite material belonging to the group comprising polyolefins (polyethylene, polypropylene, etc.), styrene materials (polystyrene, acrylonitrile butadiene styrene etc.), polyamides (PA6, PA66, polyphthalamide, etc.), poly(phenylene sulphide), polysulfones (polyethersulfone, polysulfone, etc.), and composites reinforced with non-conductive mineral fillers such as fiberglass.

The first shell 42 may comprise first fastening means intended to secure the electronic system 20 to the first shell 42. For example, the first shell 42 may be fastened to the electronic system 20 by an adhesive. The first shell 42 also comprises a plate, for example having the shape of a disk, configured to allow the fastening of the electronic system 20 onto the plate.

The first shell 42 and the second shell 44 may be provided with second fastening means configured to secure said first shell 42 to said second shell 44. For example, the first shell 42 may be fastened to the second shell 44 by gluing, by screwing, by welding or by clipping.

In general, the electric motors have a cylindrical shape. Thus, the second shell 44 has a shape adapted to the electric motor 30. For example, the second shell 44 may have a cylindrical shape to interfit and cooperate with the electric motor 30.

According to a non-limiting variant shown in FIGS. 2 to 6, the second shell 44 comprises the fluid inlet 45 and the fluid outlet 47. The fluid inlet 45 may have a tube configured to cooperate with an inlet orifice made in the second shell 44. The inlet orifice being configured to ensure a fluid connection between the tube and the cavity 48. In this way, the fluid inlet 45 is fluidly connected with the cavity 48.

Advantageously, the heat sink 40 may comprise at least one wall 46 secured to the first shell 42 and/or to the second shell 44. According to the embodiment illustrated in FIG. 6, the heat sink comprises a plurality of walls 46 included on the second shell 44 and projecting into the cavity 48. Each wall 46 of the plurality of walls 46 has at least one wall section 46 having a curved shape, so as to direct the passage of the cooling fluid into the cavity 48.

The provisions previously described allow the walls 46 to define a circuit for the passage of the cooling fluid in the cavity 48 and provide a larger heat exchange surface between the cooling fluid and the material constituting the plurality of walls 46.

In this way, the circuit for the passage of the cooling fluid makes it possible to cool more effectively the first shell 42 by increasing the heat exchange surface.

The invention claimed is:

1. An electric motorization device, comprising:
   an electric motor comprising a rotor intended to be set in motion, a stator and a cooling chamber configured to cool the electric motor;
   an electronic system comprising power electronic elements, the power electronic elements being configured to drive the electric motor;
   a heat sink interposed between the electric motor and the electronic system, the heat sink being intended to cool the electronic system and comprising:
   a first shell intended to cooperate with the electronic system, and configured to allow a heat exchange between a cooling fluid and the electronic system;
   a second shell intended to cooperate with the electric motor on the one hand and with the first shell on the other hand, the second shell being configured to prevent a heat exchange between the cooling fluid and the electric motor;
   the first shell and the second shell defining between them a cavity, the cavity being configured to allow the passage of the cooling fluid; and
   the first shell and the second shell each being constituted of a material configured to guarantee an electrical insulation, between the electronic system, the cooling fluid and the electric motor;
   wherein the heat sink comprises at least one fluid inlet which is fluidly connected with the cavity, the at least one fluid inlet being configured to allow the entry of the cooling fluid into the cavity; and
   at least one fluid outlet which is fluidly connected with the cavity on the one hand and with the cooling chamber on the other hand, and intended to allow the passage of the cooling fluid from the cavity to the cooling chamber and the heat sink comprises a ring of material secured to the first shell and/or to the second shell, and a plurality of walls projecting into the cavity and being configured to direct the passage of the cooling fluid into the cavity and the plurality of walls configured to define a circuit for the passage of the cooling fluid in the cavity, wherein each of plurality of walls having a first end secured to the ring of material and an opposite free end that is not secured to the ring of material and each of the plurality of walls extend from the first end to the opposite free end in a direction that is perpendicular to an axial direction of the electric motor.

2. The electric motorization device according to claim 1, wherein the first shell comprises first fastening means intended to make it possible to secure the electronic system to the first shell.

3. The electric motorization device according to claim 2, wherein the first shell and the second shell comprise second fastening means configured to secure the first shell to the second shell.

4. The electric motorization device according to claim 3, wherein the first shell is formed of a composite material configured to be thermally conductive, the composite material comprising thermally conductive fillers of the group comprising aluminum oxides, aluminosilicates, aluminum or magnesium hydroxides, boron nitrides.

5. The electric motorization device according to claim 4, wherein the second shell is formed of a thermally insulating plastic material, belonging to the group comprising polyolefins, styrene materials, polyamides, poly (phenylene sulphide), polysulphones and composites reinforced with nonconductive mineral fillers such as fiberglass.

6. The electric motorization device according to claim 1, wherein the first shell and the second shell comprise second fastening means configured to secure the first shell to the second shell.

7. The electric motorization device according to claim 1, wherein the first shell is formed of a composite material configured to be thermally conductive, the composite material comprising thermally conductive fillers of the group comprising aluminum oxides, aluminosilicates, aluminum or magnesium hydroxides, boron nitrides.

8. The electric motorization device according to claim 1, wherein the second shell is formed of a thermally insulating plastic material, belonging to the group comprising polyolefins, styrene materials, polyamides, poly (phenylene sulphide), polysulphones and composites reinforced with nonconductive mineral fillers comprising fiberglass.

9. The electric motorization device according to claim 1, wherein each of the plurality of walls has at least one wall section having a curved shape.

* * * * *